(12) United States Patent
Sinn et al.

(10) Patent No.: US 10,558,948 B2
(45) Date of Patent: Feb. 11, 2020

(54) TARGETED INSTANT MESSENGER BEHAVIORS EMPLOYED FOR OPTIMIZATION OF A CLIENT

(75) Inventors: Richard Sinn, Milpitas, CA (US);
Takchun Tse, Sunnyvale, CA (US);
Bing Yuan, Pacifica, CA (US);
Kingston Choy, Fremont, CA (US)

(73) Assignee: OATH INC., New York, NY (US)

( * ) Notice: Subject to any disclaimer, the term of this patent is extended or adjusted under 35 U.S.C. 154(b) by 1328 days.

(21) Appl. No.: 12/211,078

(22) Filed: Sep. 15, 2008

(65) Prior Publication Data

US 2010/0070962 A1    Mar. 18, 2010

(51) Int. Cl.
| | | |
|---|---|---|
| G06F 9/44 | (2018.01) | |
| G06Q 10/10 | (2012.01) | |
| G06F 8/61 | (2018.01) | |
| G06F 8/658 | (2018.01) | |
| G06F 8/71 | (2018.01) | |

(52) U.S. Cl.
CPC ............. *G06Q 10/10* (2013.01); *G06F 8/61* (2013.01); *G06F 8/658* (2018.02); *G06F 8/71* (2013.01)

(58) Field of Classification Search
CPC .............. G06Q 30/0254; G06Q 30/02; G06Q 30/0277; G06Q 30/0251; G06Q 30/0255; G06Q 10/10; G06F 8/65
USPC .............. 717/170–173, 177–178; 705/14.52
See application file for complete search history.

(56) References Cited

U.S. PATENT DOCUMENTS

| | | | | |
|---|---|---|---|---|
| 2,006,034 | A  * | 6/1935  | Stevens ................... | B41L 1/24 |
| | | | | 462/55 |
| 5,740,549 | A  * | 4/1998  | Reilly et al. .............. | 705/14.42 |
| 5,919,247 | A  * | 7/1999  | Van Hoff et al. ............ | 709/217 |
| 6,074,434 | A  * | 6/2000  | Cole ........................ | G06F 8/64 |
| | | | | 717/170 |
| 6,141,010 | A  * | 10/2000 | Hoyle ......................... | 715/854 |
| 6,718,549 | B1 * | 4/2004  | Narin ..................... | G06F 9/454 |
| | | | | 717/178 |
| 6,771,290 | B1 * | 8/2004  | Hoyle ......................... | 715/745 |
| 6,904,592 | B1 * | 6/2005  | Johnson .................... | G06F 8/65 |
| | | | | 705/52 |
| 7,171,661 | B1 * | 1/2007  | Pinera ..................... | G06F 8/65 |
| | | | | 709/202 |

(Continued)

FOREIGN PATENT DOCUMENTS

TW    200828166 A    7/2008

OTHER PUBLICATIONS

International Search Report and Written Opinion dated Apr. 16, 2010 in PCT/US2009/054412.

(Continued)

*Primary Examiner* — Lewis A Bullock, Jr.
*Assistant Examiner* — Tina Huynh
(74) *Attorney, Agent, or Firm* — James J. DeCarlo; Greenberg Traurig, LLP

(57) ABSTRACT

A system and method are disclosed for selectively updating software and sending other information, such as advertisements, to an IM client device based on client-side behavior vectors collected from the IM client. Behavior vectors are information related to a software component, such as IM client messenger, client device, and a user of the client device, including, but not limited to core software, optional software, advertisements displayed, usage data, performance data, and client meta data.

25 Claims, 6 Drawing Sheets

(56) References Cited

U.S. PATENT DOCUMENTS

| | | | | |
|---|---|---|---|---|
| 7,620,948 | B1* | 11/2009 | Rowe | G06F 8/65 717/171 |
| 7,707,573 | B1* | 4/2010 | Marmaros et al. | 717/178 |
| 7,844,491 | B1* | 11/2010 | Haitsuka | G06Q 30/02 705/14.36 |
| 7,971,202 | B2* | 6/2011 | Bell et al. | 717/172 |
| 8,311,513 | B1* | 11/2012 | Nasserbakht | G06Q 10/109 455/410 |
| 2002/0167542 | A1* | 11/2002 | Florin | 345/745 |
| 2002/0178447 | A1* | 11/2002 | Plotnick et al. | 725/36 |
| 2002/0187750 | A1* | 12/2002 | Majumdar | 455/41 |
| 2003/0066065 | A1* | 4/2003 | Larkin | G06F 8/65 717/177 |
| 2004/0015953 | A1* | 1/2004 | Vincent | G06F 8/65 717/173 |
| 2004/0044999 | A1* | 3/2004 | Gibson | G06F 8/65 717/178 |
| 2004/0060044 | A1* | 3/2004 | Das | G06F 8/65 717/171 |
| 2004/0181790 | A1* | 9/2004 | Herrick | 717/168 |
| 2005/0085239 | A1* | 4/2005 | Cedervall | H04W 64/00 455/456.1 |
| 2005/0086357 | A1* | 4/2005 | Lipsky et al. | 709/231 |
| 2005/0091651 | A1* | 4/2005 | Curtis et al. | 717/168 |
| 2005/0097549 | A1* | 5/2005 | Chu | H04L 63/107 717/178 |
| 2005/0273779 | A1* | 12/2005 | Cheng | G06F 8/62 717/168 |
| 2006/0056369 | A1* | 3/2006 | Morishige | H04W 48/17 370/338 |
| 2006/0106806 | A1* | 5/2006 | Sperling et al. | 707/10 |
| 2006/0112375 | A1* | 5/2006 | Schneider | 717/131 |
| 2006/0168578 | A1* | 7/2006 | Vorlicek | G06F 8/65 717/168 |
| 2006/0223518 | A1* | 10/2006 | Haney | H04W 4/023 455/420 |
| 2006/0282312 | A1* | 12/2006 | Carlson | G06Q 30/02 705/14.5 |
| 2007/0167174 | A1* | 7/2007 | Halcrow | H04W 48/16 455/456.2 |
| 2007/0174467 | A1* | 7/2007 | Ballou et al. | 709/227 |
| 2007/0214215 | A1* | 9/2007 | McCaleb | G06F 8/65 709/203 |
| 2007/0218891 | A1* | 9/2007 | Cox | G01C 21/20 455/422.1 |
| 2008/0028395 | A1* | 1/2008 | Motta | G06F 8/65 717/177 |
| 2008/0046878 | A1* | 2/2008 | Anderson | G06F 8/68 717/168 |
| 2008/0222626 | A1* | 9/2008 | Kumar Hirsave et al. | 717/168 |
| 2008/0275899 | A1* | 11/2008 | Baluja | G06Q 30/02 |
| 2009/0024546 | A1* | 1/2009 | Ficcaglia | G06Q 30/02 706/12 |
| 2010/0333081 | A1* | 12/2010 | Etchegoyen | G06F 8/60 717/172 |
| 2015/0193215 | A1* | 7/2015 | Jianu | G06F 8/61 717/177 |

OTHER PUBLICATIONS

Session Initiation Protocol: RFCs and Drafts; http://www1.cs.columbia.edu/sip/drafts.html; printed Feb. 4, 2009; 8pp.

Official Communication for Taiwanese Patent Application No. 98128767 dated Oct. 8, 2012.

* cited by examiner

TARGETED INSTANT MESSENGER BEHAVIORS EMPLOYED FOR OPTIMIZATION OF A CLIENT

TECHNICAL FIELD

The present disclosure is directed to instant messaging (IM), in general, and to improving the performance of an IM client, in particular, but not exclusively.

BACKGROUND

With the ubiquity of computers and communication networks, such as the Internet, human interactions and communications have increased exponentially in recent years. More particularly, with the development of the World Wide Web (WWW) and application programs called browsers that are used as the primary interface with the WWW, users can communicate in a variety of ways. The client-server architecture is one of the most common architectures employed in utilizing the WWW, although other architectures and methods, such as peer-to-peer (P2P) and ad-hoc communications, may also be used. Other than viewing or searching for content, the browser may be used to, directly or indirectly, host applications such as media players, various business applications, etc. One of the types of applications that are implemented in conjunction with or independent of the browser, is Instant Messaging (IM). Using IM, various users, usually belonging to a group of friends defined by a "buddy list," may interact and communicate, for example, by entering text or uploading pictures and files. IM is typically real-time and is based on messaging protocols that are streamlined to maintain the real-time performance requirements. Client applications, such as IM, may be updated from time to time as new versions, enhancements, or the like, become available for such applications.

BRIEF DESCRIPTION OF THE DRAWINGS

Non-limiting and non-exhaustive embodiments of the present invention are described in reference to the following drawings. In the drawings, like reference numerals refer to like parts through all the various figures unless otherwise explicit.

For a better understanding of the present disclosure, a reference will be made to the following detailed description, which is to be read in association with the accompanying drawings, wherein.

DETAILED DESCRIPTION

Figure 1:
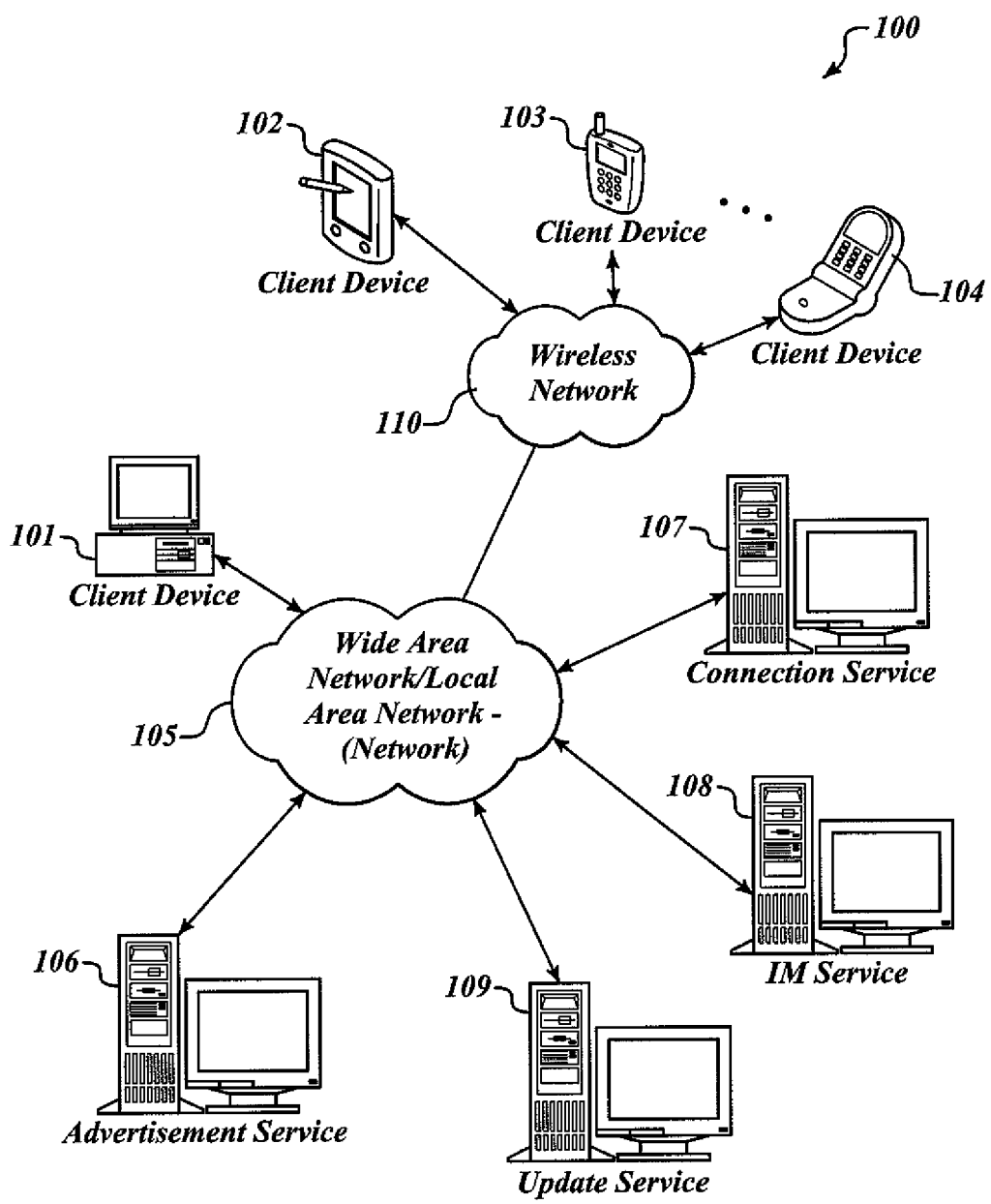
FIG. 1 is a system diagram of one embodiment of an environment in which aspects of the invention may be practiced.

The present disclosure will now be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly described, the present disclosure is directed to selectively updating software and sending other information, such as advertisements, to an IM client device based on client-side behavior vectors collected from the IM client. Behavior vectors are information related to IM client messenger, client device, and a user of the client device, including, but not limited to core software, optional software, advertisements displayed, usage data, performance data, and client meta data.

With hundreds of millions of users using IM systems and applications daily all over the globe, savings realized by not downloading unnecessary software components or ads can be substantial to both providers and the end-users. Collection of behavior vectors may enable better client ads targeting, reduce use of bandwidth on software updates by selective download of software updates and upgrades, enable international targeting of IM users (for example, components that work for US users may not work as well for users in Japan, thus, download of such components for Japan may be skipped), and enable user- or client-dependent features, such as the appropriate skin for the user, high-end (for example, high resolution) video for the appropriate user and client device, or the like. Additionally, use of behavior vectors may enable user behavior data mining for future ad campaigns.

Those skilled in the relevant art will appreciate that even though the present disclosure describes various embodiments in an IM environment, the same concepts, methods, and systems may be applied to other application environments without departing from the spirit of the present disclosure. For example, the updating and data collection concepts described herein may be applied to other types of messaging systems such as Short Message Service (SMS), Multimedia Message Service (MMS), internet relay chat (IRC), Mardam-Bey's IRC (mIRC), Jabber, etc.

Illustrative Operating Environment

FIG. 1A shows components of one embodiment of an environment in which the invention may be practiced. Not all the components may be required to practice the invention, and variations in the arrangement and type of the components may be made without departing from the spirit or scope of the invention. As shown, system 100 of FIG. 1A includes local area networks ("LANs")/wide area networks ("WANs")—(network) 105, wireless network 110, client devices 101-104, advertisement service 106, connection service 107, IM service 108, and update service 109.

One embodiment of a client device usable as one of client devices 101-104 is described in more detail below in conjunction with FIG. 2. Briefly, however, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device, including, without limit, content services 108-109. The client devices 101-104 may also be configured to receive IM messages from other clients directly and/or via the IM services 107. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Client devices 101-104 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

Client devices 101-104 may farther be configured to include a client application that enables the user to log into a user account that may be managed by another computing device. Such user account, for example, may be configured to enable the user to receive emails, send/receive IM messages, SMS messages, access selected web pages, download scripts, applications, or a variety of other content, or perform a variety of other actions over a network. However, managing of messages or otherwise accessing and/or downloading content, may also be performed without logging into the user account. Thus, a user of client devices 101-104 may employ any of a variety of client applications to receive/send messages such as IM messages, and the like.

Wireless network 110 is configured to couple client devices 102-104 to network 105. Wireless network 110 may include any of a variety of wireless sub-networks that may further overlay stand-alone ad-hoc networks, and the like, to provide an infrastructure-oriented connection for client devices 102-104. Such sub-networks may include mesh networks, Wireless LAN (WLAN) networks, cellular networks, and the like.

In one embodiment, client devices 101-104 may also include a component configured to collect information about a user's use behavior, performance and configuration information about the client device, and the like. Such collected information may then be provided to one or more other network devices, such as ad service 106 and/or update service 109, for use in selectively providing software updates and/or ads to a client device.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data OSM Environment (EDGE), WEDGE, Bluetooth, High Speed Downlink Packet Access (HSDPA), Universal Mobile Telecommunications System (UMTS), Wi-Fi, Zigbee, Wideband Code Division Multiple Access (WCDMA), and the like. In essence, wireless network 110 may include virtually any wireless communication mechanism by which information may travel between client devices 102-104 and another computing device, network, and the like.

Network 105 is configured to couple advertisement service 106, connection service 107, IM service 108, and update service 109, and their respective components, with other computing devices, including, client devices 102-104, and through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically may enable transmission of computer-readable instructions, data structures, program modules, or other types of content, virtually without limit. By way of example, communication media includes wired media such as twisted pair, coaxial cable, fiber optics, wave guides, and other wired media and wireless media such as acoustic, RF, infrared, and other wireless media.

Ad service 106 is configured to provide advertisement services to one or more of client devices 101-104 via network 105. In one embodiment, the ad service 106 is a repository of advertisement campaigns including advertisements (ad) that are selectively downloaded to client devices 101-104 based on a client configuration and/or user related criteria. For example, ads that may be downloaded to a client device 102 or 104 may be selected based on a small display size, limited memory, and limited processing power, while ads downloaded to client device 101 may selected based on a different, large display size, more memory, and processing power compared to smaller client devices. Ad service 106 is more fully described below with reference to FIGS. 3 and 4A.

In one embodiment, connection service (CS) 107 may be used to couple client devices 101-104 to other services, for example, the IM service 108. CS 107 may perform login functions, such as user authentication and authorization, load balancing, connection routing, user account management, session control, or the like.

In one embodiment, IM service 108 may be used to offer IM services. IM service 108 typically maintains state and/or profile information about the client devices that are used to facilitate IM transactions. Such state information may include, but is not limited to, determining what geographic area does the client belong to (for example, based on the client's IP address), what language the client uses for IM, or the like. In one embodiment, IM service 108 includes a server messenger component (not shown) for handling incoming messages from sending clients, storing the incoming messages, and sending/relaying outgoing messages to receiving or remote clients. IM service 108 may be coupled with CS 107, which is in turn used to connect clients to IM service 108.

Those skilled in the art will appreciate that the same functionalities described above for CS 107 and IM service 108 may be implemented using other arrangements of components without departing from the spirit of the present disclosures. For example, the functions performed by IM service 108 and/or CS 107 may be integrated in one server. Conversely, the functions performed by each of these services may be decomposed and distributed over different servers. For instance, in one embodiment, CS 107 may perform basic low-level connection tasks while leaving user authentication to another server. In another embodiment, connection services such as authentication or accounting tasks may be performed by CS 107.

Update service 109 may be coupled with network 105 to provide update services to client devices 101-104. Update services may include initial software installations, such as IM client messenger software, software upgrades, optional components, such as toolbars, and software fixes or patches for identified and corrected software bugs, among other services. In one embodiment, update service 109 receives behavior vectors, information about a user's usage behavior and/or client device configuration and performance information, from client devices 101-104, based on which update service 109 selects software updates/upgrades and ads for download to client devices 101-104. Such selected updates and ads may constitute less than all updates and ads that are available for download to client devices 101-104, thus, saving network bandwidth and other resources, such as processor and memory resources, time, or the like, by not downloading unnecessary updates and/or ads to the client devices. For example, a set of software updates or other information, such as ads, may be identified, a subset of which is selected, based on the behavior vectors, for download to the client devices 101-104.

Illustrative Mobile Client Environment

Figure 2:
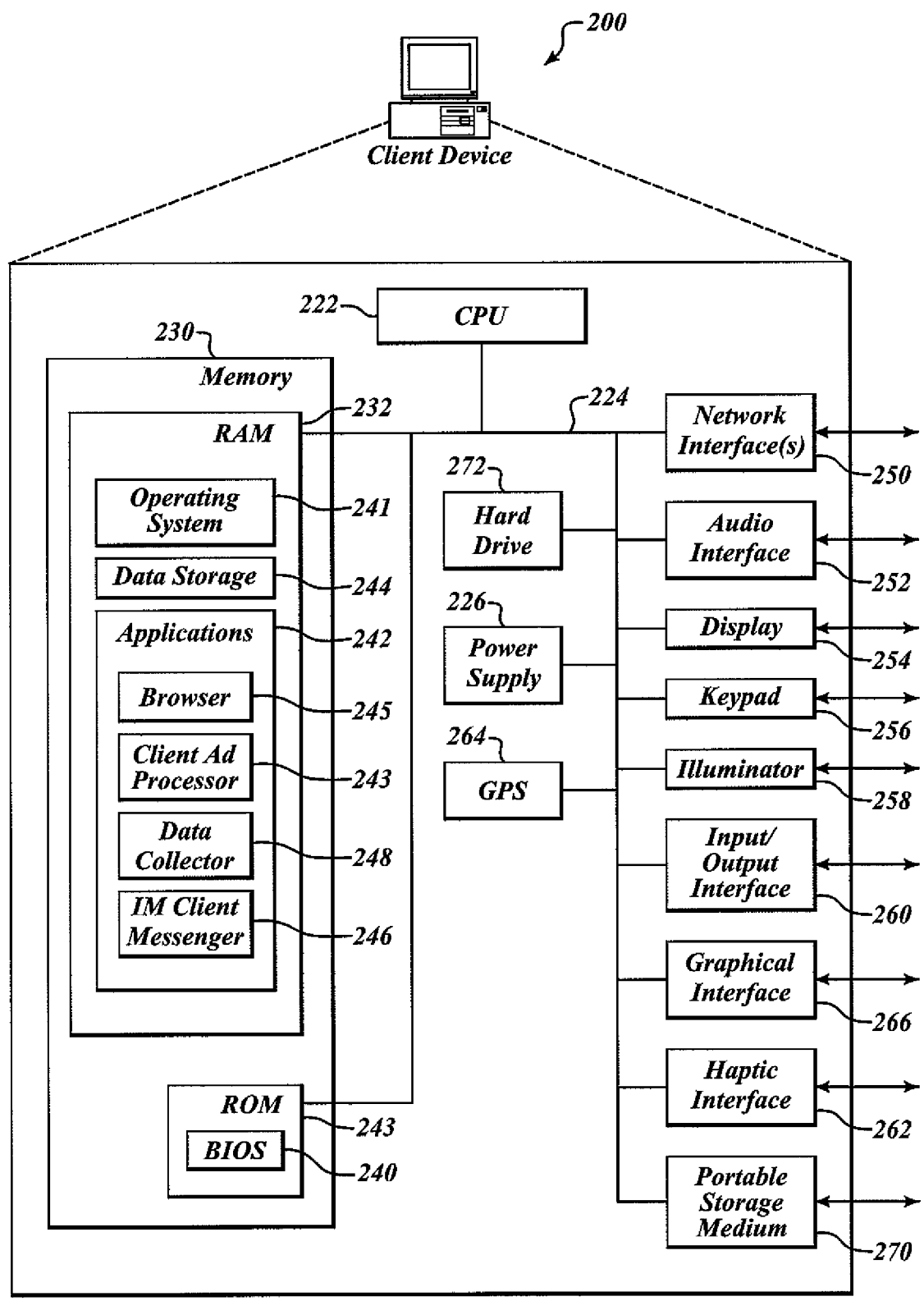
FIG. 2 shows one embodiment of a client device that may be included in a system implementing aspects of the invention.

FIG. 2 shows one embodiment of client device 200 that may be included in a system implementing the invention. Client device 200 may include many more or less components than those shown in FIG. 2. However, the components shown are sufficient to disclose an embodiment for practicing the present invention. Client device 200 may represent, for example, client devices 101-104 of FIG. 1A.

As shown in the figure, client device 200 includes a processing unit (CPU) 222 in communication with a mass memory 230 via a bus 224. Client device 200 also includes a power supply 226, one or more network interfaces 250, an audio interface 252 that may be configured to receive an audio input as well as to provide an audio output, a display 254, a keypad 256, an illuminator 258, an input/output interface 260, a haptic interface 262, and a global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery. Client device 200 may also include a graphical interface 266 that may be configured to receive a graphical input, such as through a camera, scanner, or the like. In addition, client device 200 may also include its own camera, for use in capturing graphical images.

Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (Wi-Max), SIP/RTP, Bluetooth, Wi-Fi, Zigbee, UMTS, HSDPA, WCDMA, WEDGE, or any of a variety of other wired and/or wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light, Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications and/or other data. For example, data storage 244 may also be employed to store information that describes various capabilities of client device 200, a device identifier, and the like. The information may then be provided to another device based on any of a variety of events, including being sent as part of a header during a communication, sent upon request, or the like.

Applications 242 may include computer executable instructions which, when executed by client device 200, transmit, receive, and/or otherwise process messages (e.g., SMS, MMS, IMS, IM, email, and/or other messages), audio, video, and enable telecommunication with another user of another client device. Other examples of application programs include calendars, browsers, email clients, IM applications, VOIP applications, contact managers, task managers, database programs, word processing programs, security applications, spreadsheet programs, games, search programs, and so forth. Applications 242 may Her include browser 245, ad processor 243, data collector 248, and IM client messenger 246.

Client ad processor 243 is a client component that may perform functions associated with displaying ads on client device 200. For example, client ad processor 243 may consider display size of the client device for determining a location for a particular ad to be displayed. Such ads may be provided for display through pop-ups in an operating system window, within a browser, such as browser 245, and/or displayed through IM client messenger 246. Browser 245 may also interact with client ad processor 243 to display the ads. Client ad processor 243 may determine a real-time schedule for display of a series of ads based on available display area, user activity at the time, available processing resources of the client device at the time, for example, for displaying animation or streaming video, and the like. In one embodiment, ad processor 243 may include an interface component for communicating directly with ad service 106 to obtain appropriate ads based on certain criteria, such as IM behavior vectors (IBV) 422, more fully described below with respect to FIGS. 4A and 4B.

Data collector 248 is client component that may collect some or all of the information associated with IBV 422. The IBV 422 related information may be collected from many sources on client device 200, including measurement of computing parameters, such as memory usage, processor usage, and the like, directly or indirectly, monitoring user actions and collecting statistical information, and meta data associated with software components, such as software version. Data collector 248 is more fully described below with respect to FIGS. 4A and 4B.

Browser 245 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may also be employed. Thus, in one embodiment, browser 245 may interact with IM client messenger 246 to enable IM message communications.

IM client messenger 246 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, IM client messenger 246 may be configured as an IM application, such as AOL Instant Messenger, Yahoo! Messenger, .NET Messenger Server, ICQ, or the like. In one embodiment IM client messenger 246 may be configured to include a mail user agent (MUA) such as Elm, Pine, MH, Outlook, Eudora, Mac Mail, Mozilla Thunderbird, or the like. In another embodiment, IM client messenger 246 may be a client application that is configured to integrate and employ a variety of messaging protocols.

In one embodiment, A user may log on to IM client messenger 246 and type text messages and/or upload files and pictures for real-time transmission to another, typically remote, user. The remote user may be in another country or geographic location. The IM client messenger 246 may communicate with a server-side IM messenger (not shown) for delivery of IM messages from/to remote users.

Those skilled in the relevant arts will appreciate that some of the components described above with respect to FIG. 2, for example, ad processor 243, data collector 248, and IM client messenger 246, may be integrated together in a single more comprehensive component that performs the functions of the individual components described. Conversely, some of the components may be decomposed and distributed over multiple smaller components with more focused functions. Additionally, some of the components described above may be implemented in hardware, software, firmware, or a combination of these. Furthermore, some of the components described above may be implemented using remote software components, such as web services, that may function as if a local component were performing the same function.

Illustrative Server Environment

Figure 3:
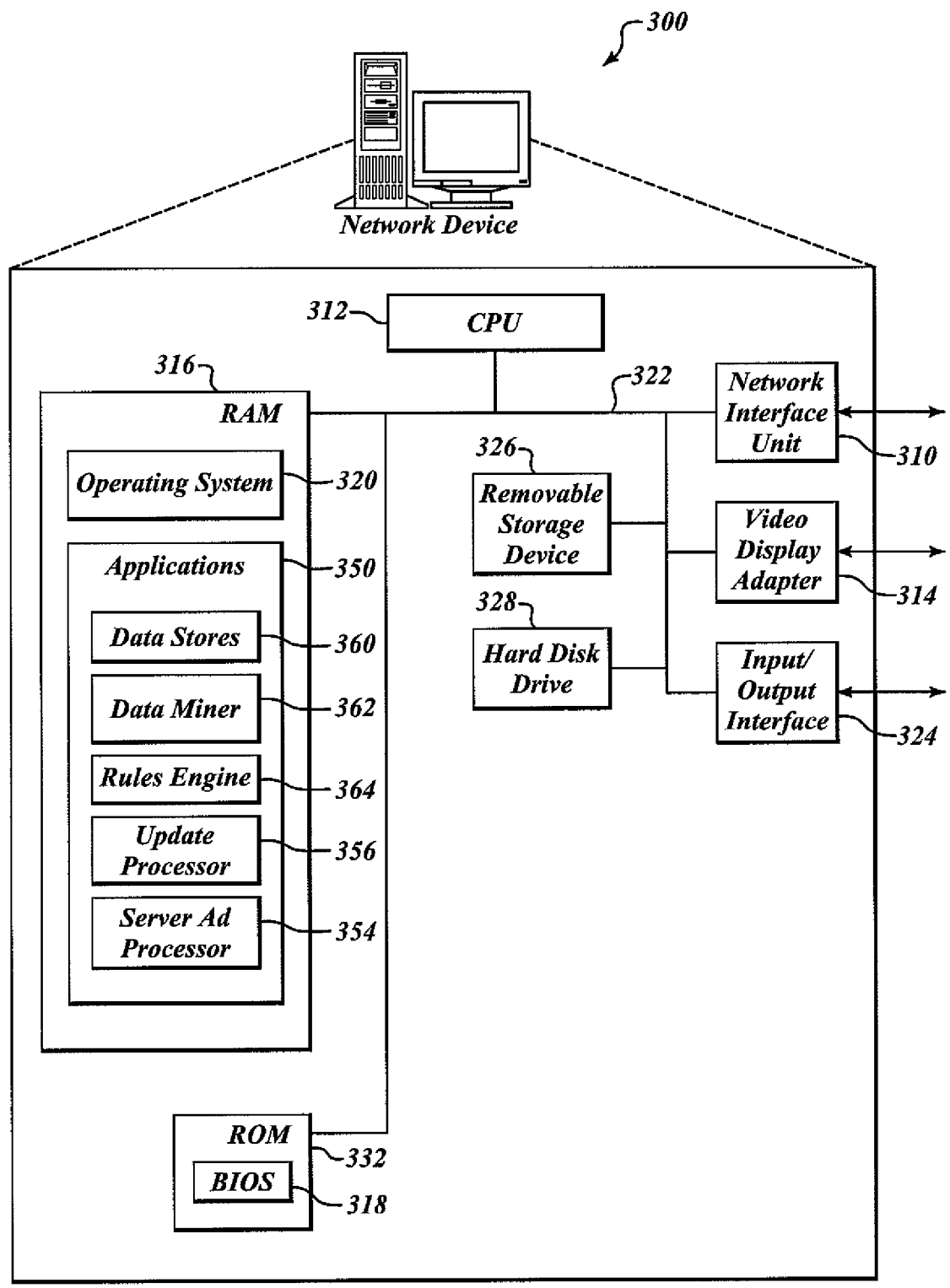
FIG. 3 shows one embodiment of a network device that may be included in a system implementing aspects of the invention.

FIG. 3 shows one embodiment of a network device, according to one embodiment of the invention. Server device 300 may include many more components than those shown. The components shown, however, are sufficient to disclose an embodiment for practicing the invention. Server device 300 may represent, for example, ad service 106, connection service 107, IM service 108, and update service 109, and/or a combination of two or more these devices discussed with respect to FIG. 1.

Server device 300 includes processing unit 312, video display adapter 314, and a mass memory, all in communication with each other via bus 322. The mass memory generally includes RAM 316, ROM 332, and one or more permanent mass storage devices, such as hard disk drive 328, and removable storage device 326 that may represent a tape drive, optical drive, and/or floppy disk drive. The mass memory stores operating system 320 for controlling the operation of server device 300. Any general-purpose operating system may be employed. Basic input/output system ("BIOS") 318 is also provided for controlling the low-level operation of server device 300. As illustrated in FIG. 3, server device 300 also can communicate with the Internet, or some other communications network, via network interface unit 310, which is constructed for use with various communication protocols including the TCP/IP protocol Wi-Fi, Zigbee, WCDMA, HSDPA, Bluetooth, WEDGE, EDGE, UMTS, or the like. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message services, IM message services, email services, account management and so forth. Applications 350 may further include a data miner component 362 used to extract and construct information from raw or pre-processed data, for example, collected and provided by client data collector 248; a rules engine 364 for applying update and other rules based on IBV 422; an update processor 356 for determining what updates to provide to a particular client based on result of the rules from the rules engine 364; and server ad processor 354 for performing some or all of the functions of ad service 106 related to management of ads and ad campaigns and providing ads to client ad processor 243.

Figure 4A:
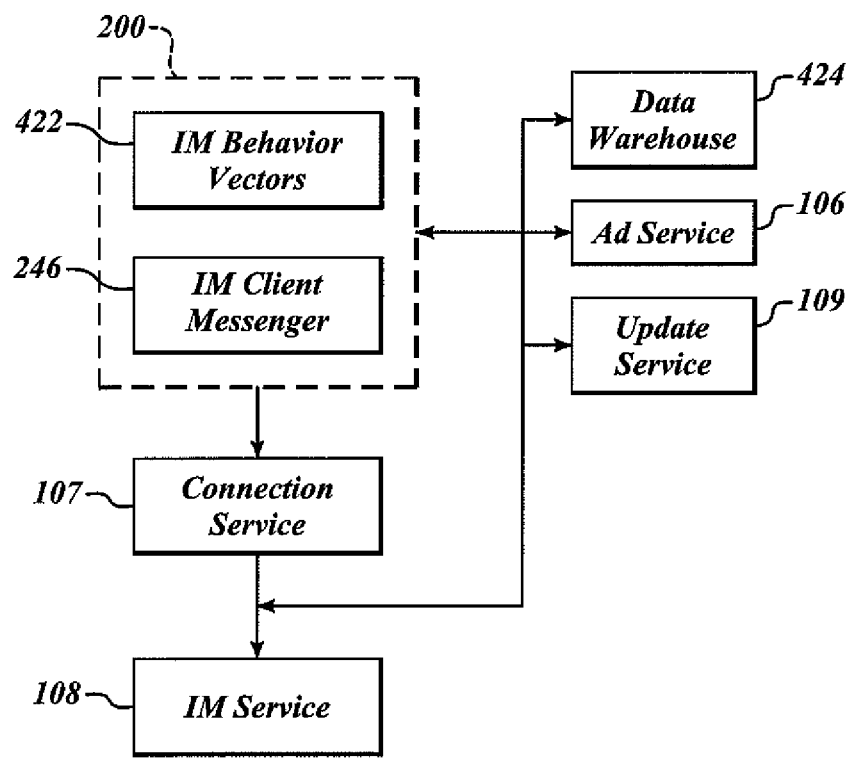
FIG. 4A shows one embodiment of aspects of an IM operating environment.

FIG. 4A shows an environment depicting aspects of the relationships between client 200 and the various servers involved in an IM system. In one embodiment, client-side IBV 422 information collected on client 200 are communicated to one or more servers across network 105 and/or wireless network 110 to provide the data needed to make software update and/or advertising decisions. This embodiment includes client 200 having IM client messenger component 246 and IBV 422 information collected from various sources within client device 200, for use by connection service 107, IM service 108, data warehouse 424, ad service 106, and update service 109.

In one embodiment, IBV 422 include, but are not limited to, the following component vectors: information about IM messenger 246 core software components currently installed on the client device, information about IM messenger 246 optional software components currently installed on the client device, ads downloaded to the client device, IM usage and conversation information, IM client messenger 246 and/or client device performance information, and client-related meta data, such as IM client messenger 246 version information, upgrade paths, update locations expressed, for example, as a URL (Uniform Resource Locator), and the like. Other types of information may be included in IBV 422. For example, information that may not be directly related to a particular client device, such as network traffic information, network bandwidth, and the like, for a network to which the client device is coupled, may also be collected and used like other IBV 422 components collected directly from the client device.

Those skilled in the art will appreciate that other behavior vectors based on software and applications other than IM, may be utilized to selectively provide downloadable information, such as ads and update/upgrade packages for such software and applications. For example, operating system components, such as file system, drivers, user interface, and other similar components may need updates/upgrades from time to time. Such updates/upgrades may be selectively provided to avoid downloading unnecessary updates that may not be fully usable or utilizable by the client device. Similarly, behavior vectors may be used for selective update/upgrade of other specific applications or family of applications, such as office software applications including word processing, spreadsheets, and the like.

In operation, in one embodiment, IM client messenger 246 may provide behavior vectors to server components, such as ad service 106, update service 109 and IM service 108, via CS 107 that may be used to connect client device 200 to these services. In another embodiment, client device 200 may connect directly to one or more of these services. In yet another embodiment, client device 200 may connect to some of the services directly and to other services via CS 107. For example, IM client messenger 246 may connect directly to the ad service 106 or update service 109 via a background process running on client device 200 not visible or accessible to a user of the client device 200.

In one embodiment, IM service 108 may process part or all of IBV 422 information or in collaboration with other services. For example, in one embodiment, IM service 108 may be distinct from other services, while in another embodiment, IM service 108 may be integrated with some or all of the other services, such as update service 109 or ad service 106.

In one embodiment, data warehouse 424 is a database associated with one of the services, for example, update service 109 or IM service 108. In another embodiment, data warehouse 424 is a database on a different and/or remote service. In one embodiment, IBV 422 information is stored in data warehouse 424, for example, directly by client-side data collector 248 or via IM service 108. Data stored in data warehouse 424 may be mined to extract different patterns, such as user behavior patterns, as more fully described below with respect to FIG. 4B.

In one embodiment, ad service 106 includes server ad processor 354 which communicates directly with client ad processor 243. Server ad processor 3 54 may determine what ads to download to an IM client device based on IBV 422. Server ad processor 354 may analyze, store, manage, and retrieve ads targeted towards users based on certain criteria that may be demographic in nature, such as age, sex, ethnicity, income level, etc., as well as based on other criteria, such as subject matter of the IM communications.

Client ad processor 243 may provide information about ads that have been displayed on the client device 200. In one embodiment, client ad processor 243 may be limited to collecting information about ads displayed via the IM client messenger running on client device 200. In another embodiment, in addition to collecting information about ads displayed via the IM application, client ad processor 243 may also collect information about ads displayed via other applications running on client device 200, such as a browser, not directly related to the IM application. Server ad processor 354 may pre-process information about ads provided by client ad processor 243 before relaying such information to data warehouse 424. In another embodiment, client ad processor 243 communicates with update processor 356, which in turn relays part or all of the information to server ad processor 354. The server ad processor 354 may in turn provide new ads for display to client ad processor 243, via update processor 356.

In one embodiment, update service 109 includes update processor 356 which communicates with IM client messenger 246 to provide software updates for IM client messenger 246 and its optional components, such as toolbars or application skins. Application skins are software frames including controls, such as buttons and sliders, that enclose a visible portion of an application, such as a media player or IM user interface. Application skins typically have a theme that can be commercial in nature, for example, displaying logo or trademark of a company or service provider, or other themes that a user may choose, such as nature themes, pet themes, or the like. Update service 109 may also be used to download appropriate "IMVironments," (IMV) that are theme environments that a user of the IM client messenger can choose, or that can be automatically downloaded to the IM client messenger for display. IMV is typically shown in the conversation area of the IM client messenger user interface window. For example, a IMV may show a fish tank or a shopping mall.

Generalized System Operation

Figure 4B:
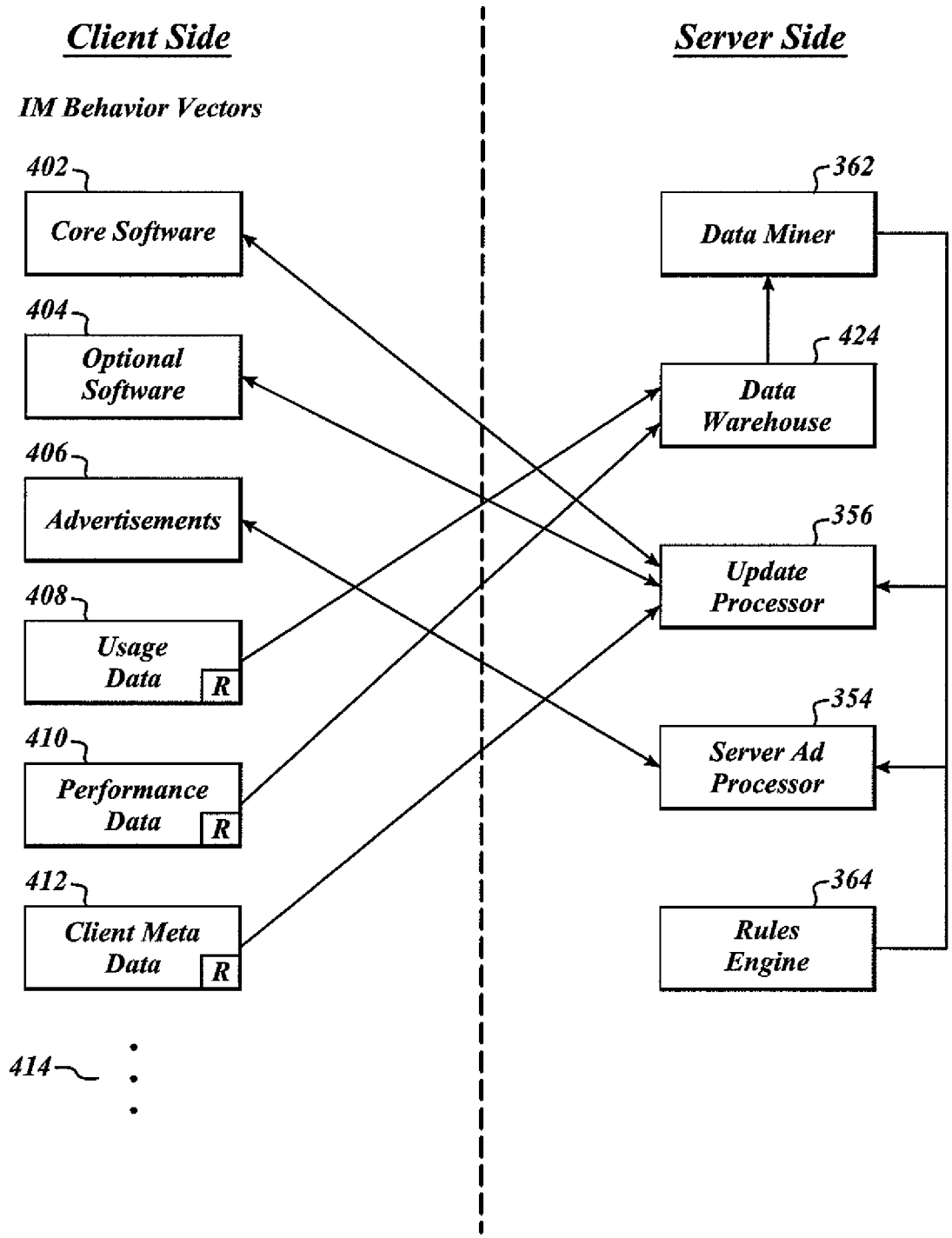
FIG. 4B shows an embodiment of aspects of IM behavior vectors as related to other IM system components.

FIG. 4B shows an embodiment of aspects of IBV 422 as related to other IM system components. In one embodiment, update service 109 obtains IBV 422 collected by data collector 248 on the client-side and uses the IBV 422 information for determining what software updates and other information, such as ads, to download to client device 200.

In one embodiment, when a user of client device 200 logs onto the IM client messenger running on the client device 200, IM client messenger 246 makes a connection with update service 109 and determines if any software updates or other new information are available for download and installation on client device 200. In another embodiment, update service 109 may query IM client messenger 246 upon a connection made for IM message exchange with another client. The IM client messenger 246 may download a file or other data record to determine what updates are available and from what location such updates may be downloaded. For example, the IM client messenger 246 may download a client-specific or location-specific update file that includes information about updates available for each component in IM messenger 246. For example, information about updates may include URL of the update, component name, directory information, file version information, file size information, or the like. Such updates are downloaded to client device 200 using rules and criteria based on IBV 422.

Those skilled in the art will appreciate that a similar process as described above with respect to IM client messenger 246, may be used to selectively update/upgrade other software and applications and also to selectively download other information, such as ads.

In one embodiment, data collector 248 (see FIG. 2) is implemented as one component that collects all IBV 422 vectors and sends to the appropriate service for processing. In another embodiment, data collector 248 may include two or more components, each being responsible for collecting one or more of the IBV 422 components separately from other data collector 248 components. Similarly, in one embodiment, data collector 248 sends the IBV 422 information to a service, such as update service 109, while in another embodiment, data collector 248 sends some or all of the IBV 422 information to more than one service, for example, to update service 109 and ad service 106.

In one embodiment, some of the IBV 422 vectors are obtained and used in real-time during an ongoing IM session and some of the IBV 422 vectors are obtained from a historical long-term database, such as data warehouse 424. For example, current performance data 410 and client meta data 412 may be obtained and used in real-time, while usage data 408 may be obtained from warehouse 424, since such usage data generally may have a longer period of accumulation to be statistically meaningful. In one embodiment, IBV 422 may include user profile information such as demographic information about the users of the IM system. The user profile information may include age, sex, language, shopping habits, preferences, and the like.

In one embodiment, IBV 422 includes core software 402, optional software 404, ads 406, usage data 408, performance data 410, and client meta data 412, among other type of data 414. Core software 402 include the fundamental components of IM client messenger 246 that typically constitute executable code, provide the functionality, and software services for IM client messenger 246 to run and support other components. For example, core software 402 may include security components, core elements of IM client messenger 246 like user interface, message processing engine, or the like.

Optional software 404 includes components of IM messenger 246 that are in addition to the core software 402. For example, optional software 404 may include IMV, skins, voice components, browser services, toolbars, or the like.

Advertisements 406 include information about ads that are currently running, and/or have recently run, for example, in the last 12 hours or last week, in the IM environment on client device 200 and statistics about such ads. Advertisers may provide appropriate service and/or product advertisements based on various IBV 422 components, such as usage data 408 further discussed below. Ads provided may be, at least in part, based on the statistical analysis and other data obtained based on IBV 422 components. The ads may be appropriately matched with IM conversation subjects. For example, if IM message text includes a keyword, such as "shoe," ads about shoes for sale may be downloaded to IM client messenger 246.

Usage data 408 may include information about a user's past IM conversations and how the IM client messenger 246 is usually used by the user. For example, usage data 408 may include information about the client IM messenger 246 feature and/or controls/buttons that are clicked, how many times a voice call is used in a given period, what skins have been used in a given period, or the like. In one embodiment, this behavior vector is read-only. However, in another embodiment usage data 408 may be read/write.

Performance data 410 may include the startup performance, voice response latency, video startup performance, or the like, of client device 200. This vector gives an indication of whether any bandwidth-heavy component/feature, such as video or voice related features, is to be download/enabled for client device 200. In one embodiment, this behavior vector is read-only. However, in another embodiment performance data 410 may be read/write.

Client meta data 412 includes information about client IM messenger 246 and related components, such as version of the components, upgrade path of the IM client messenger 246 to newer and/or more powerful (for example, having more features) versions of the IM client messenger 246, the geographic location of the user/client, the international region of the user/client, or the like. In one embodiment, this behavior vector is read-only. However, in another embodiment meta data 412 may be read/write.

In one embodiment, update processor 356, rules engine 364, data warehouse 424, and data miner 362 are included in update service 109 and server-side ad processor 354 is included in ad service 106. Those skilled in the art will appreciate that these components may be distributed differently among different services in alternative embodiments without departing from the spirit of the present disclosure.

Data miner component 362 is used to extract data patterns from large amounts of data in data warehouse 424 that may be raw (for example, not pre-processed, sorted, or the like), unstructured, and unorganized. Such data patterns may be used as input to the rules engine 364 to obtain results that are used to determine software updates sent to client device 200.

In one embodiment, data collector 248 (see FIG. 2) sends IBVs core software 402, optional software 404, and client meta data 412 to update processor 356. Data collector 248 sends usage data 408 and performance data 410 to data warehouse 424 for data mining. In one embodiment, data collector 248 sends ad information 406 to server-side ad processor 354. In another embodiment, data collector 248 provides ad information 406 to client-side ad processor 243, which then sends the ad information 406 to server-side ad processor 354.

After receiving IBV 422 vectors, the server-side components shown in FIG. 4B proceed to process the vectors to determine what software updates and other information to provide to IM client messenger 246. Data miner 362 mines the data in data warehouse 424 and provides the results to update processor 356, ad processor 354, and rules engine 364. Furthermore, update processor 356 and ad processor 354 may provide additional information, such as client meta data and current installation base of core software and optional software on client device 200, to rules engine 364. Rules engine 364 applies various rules to the information provided by the data miner 362, update processor 356, and ad processor 354 to provide rule-based conclusions and/or suggestions to update processor 356 for providing software updates and ad processor 354 for providing ads to IM client messenger 246.

In one embodiment, rules executed by rules engine 364 include a condition and an action to be taken if the condition is true. For example, in the following non-limiting and non-exhaustive, illustrative symbolic rules:

(Rule 1) IF [IM subject==movie], THEN [download movie IMV];

(Rule 2) IF [startup performance>=25 seconds], THEN [skip all swf ads download], the square brackets after keyword "IF" are the rules' conditions and the square brackets after keyword "THEN" are the rules' conclusions, suggestions, or actions to be taken. It should be noted that the above rules are merely symbolic examples and rules may be implemented in any of a variety of constructs, scripts, and/or other structures.

Update processor 356 and ad processor 354 may implement and use additional rules, such as business policies, or other conditions that are applied to IBV 422 information after the rules engine 364 has applied its rules to the information. After the processing of IBV 422 information, update processor 356 and server ad processor 354 may make decisions, based on the results of such processing, about which software updates and/or ads to provide for download to IM client messenger 246.

Figure 5:
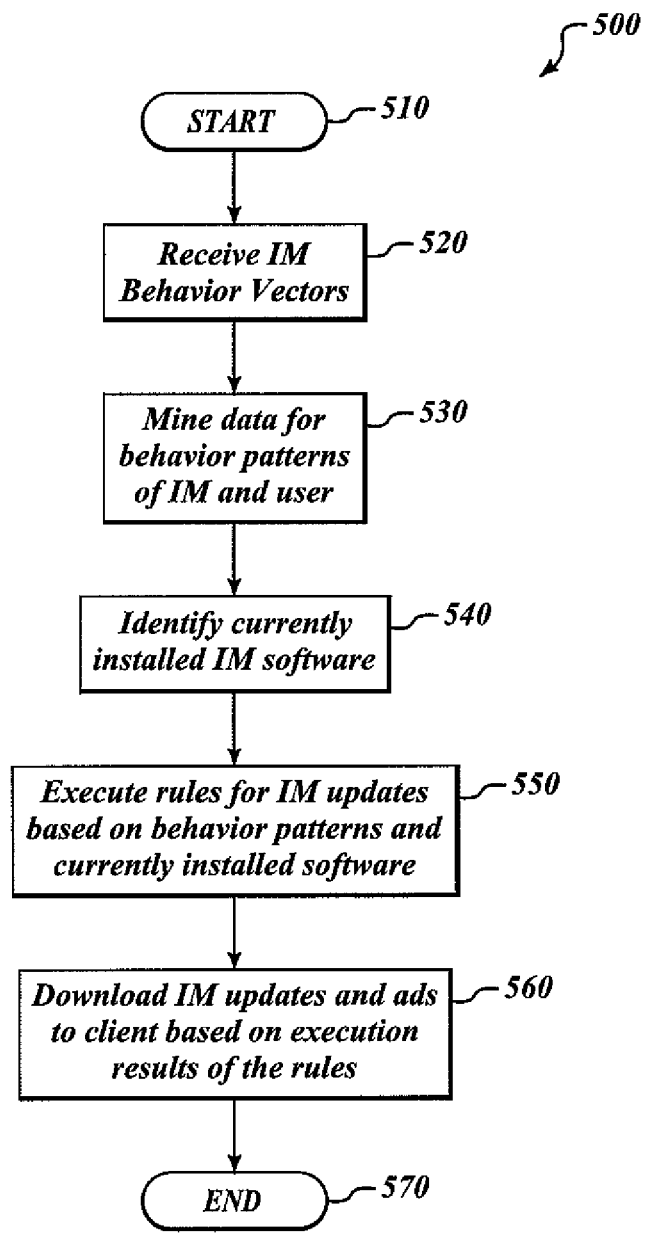
FIG. 5 shows a flow diagram of one embodiment of a process for using IM behavior vectors to determine downloads of updates and/or ads to an IM client.

The overall process of using IBV 422 for determining which software updates and/or ads to provide for download to IM client messenger 246 is now described with reference to FIG. 5. The process starts at block 510 and proceeds to block 520 where IBV 422 vectors are received by various server-side components. For example, as discussed above, core software and optional software 402 and 404, respectively, may be received by update processor 356, while usage data 408 and performance data 410 may be received by data warehouse 424.

At block 530, data miner 362 extracts data patterns from information stored in data warehouse 424. Such data patterns may belong to the performance of IM client messenger 246, as well as the user of client device 200. For example, a data pattern for performance of IM client messenger 246 may reveal that on weekends the performance is lower than on weekdays, for example, because users may have more time to spend using an IM application than on weekdays while using fewer business applications that occupy memory. Based on such data pattern, update processor 356 may decide to postpone making an update available until a weekday when performance availability may be higher.

At block 540, currently installed core software 402 and/or optional software 404 are identified by update processor 356 to determine which, if any, updates are available and applicable to the currently installed software base. The process proceeds to block 550 where rules engine 364 executes applicable rules using mined data patterns and information from update processor 356 and/or server ad processor 354 as input conditions for the rules.

The process proceeds to block 560 where update processor 356 and server ad processor 354 provide software updates and ads to IM client messenger 246 based on the results of execution of rules by rules engine 364 and other processing of IBV 422 information. The process terminates at block 570.

Those skilled in the art will appreciate that although the illustrative systems and methods described in this disclosure have been described with respect to an IM messenger, the same systems, methods, and concepts may be used for software updates and information down load for other client-side applications. For example, download of software updates and upgrades for other software and applications, such as operating system software and office utility programs, such as word processors, respectively, may be performed, at least in part, based on some of the behavior vectors discussed above.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A client device comprising:
   a processor; and
   a storage medium for tangibly storing thereon program logic for execution by the processor, the stored program logic comprising:
     collecting logic executed by the processor for collecting, at the client device, behavior vectors comprising user behavior information representing a user's past use of an application, information about core application program components installed on the client device for the application, information about optional application program components installed on the client device for the application, advertisements running on the client device and statistics about the advertisements, and client device information, the client device information comprising a physical location of the client device;
     sending logic executed by the processor for sending a message comprising the collected behavior vectors to a remote update service of a server computing device, the collected behavior vectors including the client device information comprising the physical location of the client device being provided for use, by the remote update service of the server computing device, to selectively determine updates for the client device, the updates comprising one or more software updates, for the application, determined by the remote update service of the server computing device using the behavior vectors comprising the information about the core and optional application program components installed on the client device and the client device information, the updates further comprising updated advertisements;
     receiving logic executed by the processor for receiving, from the remote update service of the server computing device, the updates determined by the remote update service of the server computing device using the behavior vectors, the updates comprising the one or more software updates for the application and updated advertisements; and
     installing logic executed by the processor for installing the received one or more software updates on the client device.

2. The client device of claim 1, the stored program logic further comprising:

displaying logic executed by the processor for displaying the received advertisement on a display of the client device.

3. The client device of claim 1, the sending logic executed by the processor for sending further comprising sending usage data for the application included in the behavior vectors, the usage data being provided for use in selectively determining the updated advertisements.

4. The client device of claim 1, wherein the behavior vectors include information about one or more of usage data, client device performance data, and client device meta data.

5. The client device of claim 1, wherein the behavior are related to an instant messaging system and the application is an instant messaging application.

6. A system comprising:
an update system server comprising a processor and a storage medium for tangibly storing thereon program logic for execution by the processor, the stored program logic comprising:
receiving logic executed by the processor for receiving, from a client device over a computer network, a message comprising behavior vectors, the behavior vectors comprising user behavior information representing a user's past use of an application, information about core application program components installed on the client device for the application, information about optional application program components installed on the client device for the application and statistics about the advertisements, advertisements running on the client device, and client device information, the client device information comprising a physical location of the client device; and
providing logic executed by the processor for selectively providing download information to the client device over the computer network, comprising:
determining logic executed by the processor for determining updates for the client device using the behavior vectors comprising the information about the core and optional application program components installed on the client device and the client device information, the updates comprising one or more software updates for the application, determined using the information about the core and optional application program components installed on the client device, the updates further comprising updated advertisements determined using the behavior vectors;
generating logic executed by the processor for generating download information comprising the determined updates for the client device; and
sending logic executed by the processor for sending the download information to the client device over the computer network.

7. The system of claim 6, the stored program logic further comprising:
ad servicing logic executed by the processor for receiving the behavior vectors and selectively providing updated advertisements for download to the client device; and
data mining logic executed by the processor for mining the behavior vectors to extract data patterns for use with the selection and download rules.

8. The system of claim 6, wherein the behavior vectors include information about one or more of client device performance data and client device meta data.

9. The system of claim 6, receiving logic executed by the processor further comprising receiving logic executed by the processor for receiving usage data for the application included in the behavior vectors, the generating logic executed by the processor using the usage data in generating the download information identifying the updated advertisements.

10. The system of claim 6, wherein the behavior vectors are associated with an instant messaging system, and the application is an instant messaging application.

11. The system of claim 6, the stored program logic further comprising:
analyzing logic executed by the processor for analyzing the received behavior vectors including usage patterns of software to be updated to identify a time period when availability for updating the software is high compared to another time period; and
providing logic executed by the processor for providing the one or more software updates for the application and updated advertisements to the client device based on the determined update availability.

12. The system of claim 6, the application comprising office software applications comprising a word processing application and a spreadsheet application and the one or more software updates comprising one or more software updates to the office software applications comprising the word processing application and the spreadsheet application.

13. The system of claim 6, the sending instructing the client device to install the download information.

14. A method comprising:
receiving, by an update system server and from a client device over a computer network, a message comprising behavior vectors, the behavior vectors comprising user behavior information representing a user's past use of an application, information about core application program components installed on the client device for the application, information about optional application program components installed on the client device for the application and statistics about the advertisements, advertisements running on the client device, and client device information, the client device information comprising a physical location of the client device;
selectively providing, by the update system server, download information to the client device over the computer network, comprising:
determining updates for the client device using the behavior vectors comprising the information about the core and optional application program components installed on the client device and the client device information, the updates comprising one or more software updates for the application, determined using the information about the core and optional application program components installed on the client device, the updates further comprising updated advertisements determined using the behavior vectors;
generating, using the behavior vectors, download information comprising the determined updates for the client device; and
sending the download information to the client device over the computer network.

15. The method of claim 14, further comprising:
storing behavior vectors in a data warehouse;
mining the behavior vectors for data patterns; and
applying the selection and download rules for the data patterns.

16. The method of claim 14, the receiving further comprising receiving usage data for the application included in the behavior vectors, the generating further comprising using the usage data in generating the download information identifying the updated advertisements.

17. The method of claim 14, wherein the software updates include less than all software updates available for download to the client.

18. The method of claim 14, the sending instructing the client device to install the download information.

19. A non-transitory computer readable storage medium tangibly storing computer program instructions capable of being executed by a computer processor, the computer program instructions defining code for:
collecting, at a client device, behavior vectors comprising user behavior information representing a user's past use of an application, information about core application program components installed on the client device for the application, information about optional application program components installed on the client device for the application, advertisements running on the client device and statistics about the advertisements, and client device information, the client device information comprising a physical location of the client device;
sending, by the client device, a message comprising the collected behavior vectors to a remote update service, the collected behavior vectors including the client device information comprising the physical location of the client device being provided for use, by the remote update service of the server computing device, to selectively determine updates for the client device, the updates comprising one or more software updates, for the application, determined by the remote update service of the server computing device using the behavior vectors comprising the information about the core and optional application program components installed on the client device and the client device information, the updates further comprising updated advertisements;
receiving, from the remote update service of the server computing device, the updates comprising the one or more software updates determined by the remote update service of the server computing device using the behavior vectors, the updates for the application and updated advertisements; and
installing the received one or more software updates on the client device.

20. The computer readable storage medium of claim 19, wherein the behavior vectors are associated with an instant messaging system and the application is an instant messaging application.

21. The processor readable storage medium of claim 19, wherein the behavior vectors include information about one or more of usage data, client device performance data, and client device meta data.

22. The processor readable storage medium of claim 19, wherein the behavior vectors are sent to a data store for use by a mining component to extract data patterns.

23. A method comprising:
collecting, at a client device, behavior vectors comprising user behavior information representing a user's past use of an application, information about core application program components installed on the client device for the application, information about optional application program components installed on the client device for the application, advertisements running on the client device and statistics about the advertisements, and client device information, the client device information comprising a physical location of the client device;
sending, by the client device, a message comprising the collected behavior vectors to a remote update service of a server computing device, the collected behavior vectors including the client device information comprising the physical location of the client device being provided for use, by the remote update service of the server computing device, to selectively determine updates for the client device, the updates comprising one or more software updates, for the application, determined by the remote update service of the server computing device using the behavior vectors comprising the information about the core and optional application program components installed on the client device and the client device information, the updates further comprising updated advertisements;
receiving, by the client device from the remote update service of the server computing device, the updates determined by the remote update service of the server computing device using the behavior vectors, the updates comprising the one or more software updates for the application and updated advertisements; and
installing, by the client device, the received one or more software updates on the client device.

24. A non-transitory computer readable storage medium tangibly storing computer program instructions capable of being executed by a computer processor of an update system server, the computer program instructions defining code for:
receiving, from a client device over a computer network, a message comprising behavior vectors, the behavior vectors comprising user behavior information representing a user's past use of an application, information about core application program components installed on the client device for the application, information about optional application program components installed on the client device for the application and statistics about the advertisements, advertisements running on the client device, and client device information, the client device information comprising a physical location of the client device;
selectively providing download information to the client device over the computer network, comprising:
determining updates for the client device using the behavior vectors comprising the information about the core and optional application program components and the client device information, the updates comprising one or more software updates for the application, determined using the information about the core and optional application program components installed on the client device, the updates further comprising updated advertisements determined using the behavior vectors;
generating download information comprising the determined updates for the client device; and
sending the download information to the client device over the computer network.

25. The non-transitory computer readable storage medium of claim 24, the sending instructing the client device to install the download information.

* * * * *